United States Patent
Gilloire et al.

(10) Patent No.: US 6,556,682 B1
(45) Date of Patent: Apr. 29, 2003

(54) METHOD FOR CANCELLING MULTI-CHANNEL ACOUSTIC ECHO AND MULTI-CHANNEL ACOUSTIC ECHO CANCELLER

(75) Inventors: André Gilloire, Lannion (FR); Valérie Turbin, Lamballe (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/202,726
(22) PCT Filed: Apr. 15, 1998
(86) PCT No.: PCT/FR98/00757
§ 371 (c)(1),
(2), (4) Date: May 24, 1999
(87) PCT Pub. No.: WO98/47276
PCT Pub. Date: Oct. 22, 1998

(30) Foreign Application Priority Data

Apr. 16, 1997 (FR) .......................................... 97 04682

(51) Int. Cl.[7] ................................................ H04B 3/20
(52) U.S. Cl. ..................................... 381/66; 379/406.01
(58) Field of Search ............................ 381/66, 95, 96, 381/93; 379/406.1–406.16; 370/286

(56) References Cited

U.S. PATENT DOCUMENTS 5,970,154 A * 10/1999 Chen et al. ............ 379/406.08

FOREIGN PATENT DOCUMENTS

EP 0 627 825 12/1994
EP 0 709 999 5/1996

OTHER PUBLICATIONS

French Preliminary Search Report dated Mar. 1, 1998, French Appl. No. FR 9704682.
International Search Report dated Sep. 29, 1998; PCT Appl. No. PCT/FR98/00757.
Sondi et al., "Stereophonic Acoustic Echo Cancellation—An Overview of the Fundamental Problem", 8441 IEEE Signal Processing Letters (2), No. 8 (New York, Aug., 1995).

* cited by examiner

Primary Examiner—Ping Lee
(74) Attorney, Agent, or Firm—Gardner, Carton & Douglas (57) ABSTRACT

In order to cancel echo on several sound signal channels, the method consists in generating on each channel a synthetic signal having the spectral characteristics of a white noise; computing the frequency masking thresholds in several adjacent frequency bands using auditory perception properties; bringing in each frequency channel the synthetic signal level to the associated masking threshold value, so as to obtain an auxiliary signal, which is added to the signal associated with the loudspeaker of the channel concerned; supplying the resulting signal to an adaptive filter; adding the output signals of the associated adaptive filters to each microphone channel; subtracting the resulting signal received by the microphone of this channel; deducing an estimation error, on the basis of which the coefficients of the adaptive filters associated with this channel are corrected.

12 Claims, 6 Drawing Sheets

METHOD FOR CANCELLING MULTI-CHANNEL ACOUSTIC ECHO AND MULTI-CHANNEL ACOUSTIC ECHO CANCELLER

FIELD OF THE INVENTION

The present invention concerns a method for cancelling multi-channel acoustic echo, as well as a multi-channel acoustic echo canceller.

BACKGROUND OF THE INVENTION

In the domain of transmission of sound signals, in some applications such as "hands free" telephony and teleconference, the acoustic echo is a source of considerable inconvenience. Known devices which counteract the acoustic echo usually comprise adaptive filters, the function of which is to identify and model the impulse response of the acoustic coupling path between the loudspeaker(s) and the microphone(s) of the considered sound signals transmission system.

Figure 1:
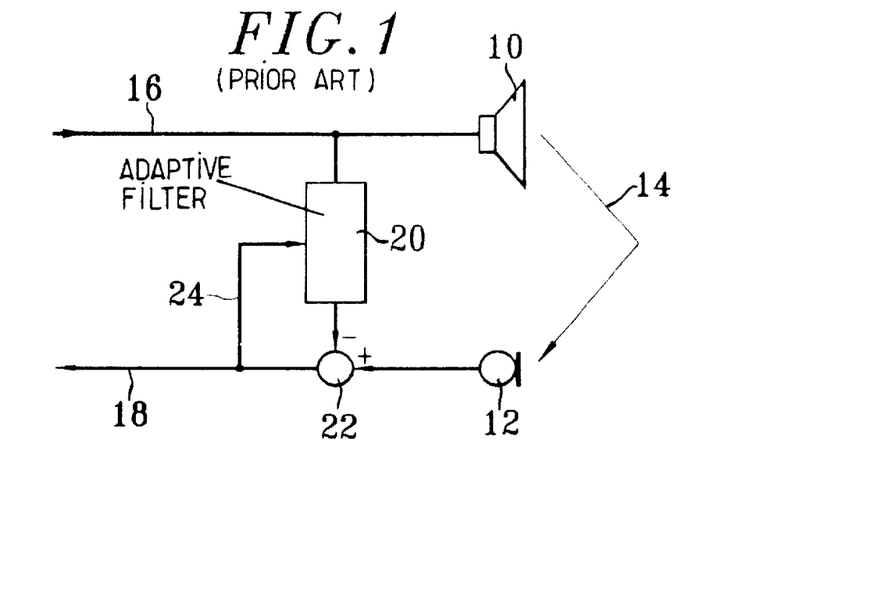
FIG. 1, relating to the prior art and described in the introduction, is a diagrammatic representation of a conventional mono-channel acoustic echo canceller.

FIG. 1 illustrates the general structure of a conventional acoustic echo canceller. It is associated with a loudspeaker 10 and a microphone 12 between which there exists an acoustic coupling path or echo path 14. References 16 and 18 designate respectively the received sound signal and the transmitted sound signal. The echo canceller of FIG. 1 includes an adaptive filter 20 receiving at its input the received sound signal 16. The object of the adaptive filter 20 is to estimate through its coefficients the impulse response of the echo path 14, in order to subtract the echo from the signal received by the microphone 12. To this end, the output of the adaptive filter 20 is connected to a subtractor 22 which subtracts the signal output by the adaptive filter 20 from the signal received by the microphone 12. The difference signal obtained at the output from the subtractor 22 supplies an estimation error 24. The coefficients of the adaptive filter 20 are adjusted over time by an appropriate algorithm which uses estimation error information.

The choice of this algorithm is the determining factor in the performances of the echo canceller. The known echo cancellation methods and devices currently use an algorithm called the normalised stochastic gradient, usually designated by the acronym NLMS. A disadvantage of this algorithm is that its convergence speed depends upon the spectral characteristics of the received sound signal. An object of the present invention is to reduce this dependence.

The problem of the acoustic echo of course also arises in multi-channel sound signals transmission systems, i.e. in systems with several loudspeakers and several microphones, for example two loudspeakers and two microphones in the case of stereophony.

Figure 2:
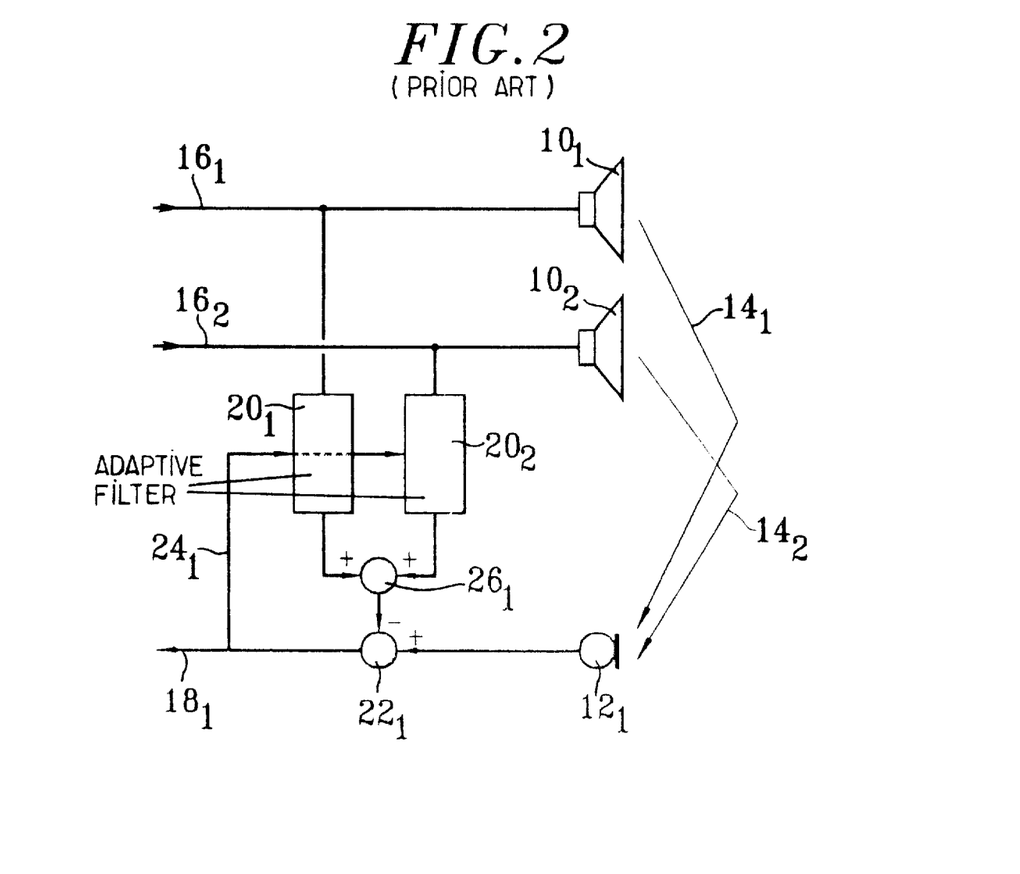
FIG. 2, also relating to the prior art and described in the introduction, is a partial diagrammatic representation of a conventional stereophonic acoustic echo canceller, where only one microphone channel is shown.

Multi-channel echo cancellation methods and devices are known based upon the same principle as those of single channel cancellation. FIG. 2 shows by way of an example the partial block diagram of a conventional stereophonic acoustic echo canceller, where, for clarity, only one of the two microphone channels has been shown. The general structure can be easily generalised to that of an acoustic echo canceller with N sound signal channels, where N is any integer. Only the case for N=2 is described in the following. In a similar manner to the echo canceller of FIG. 1, the stereophonic echo canceller is applied to received sound signal channels $16_1$, $16_2$ and transmitted sound signal channels, only one of which, designated by the reference number $18_1$, is shown. The echo canceller is associated with two loudspeakers $10_1$, $10_2$ and two microphones, only one of which, designated by the reference number $12_1$, is shown. There are four echo channels, two of which echo channels ($14_1$, $14_2$) are between the two loudspeakers $10_1$, $10_2$ and the first microphone $12_1$ and two other echo channels (not shown) are between the two loudspeakers $10_1$, $10_2$ and the second microphone. In order to estimate the impulse responses from the various echo channels, an adaptive filter is provided between each loudspeaker channel and each microphone channel. Thus, if the microphone channel $12_1$ is considered, it is provided with two adaptive filters $20_1$, $20_2$, which receive respectively as the input the received sound signals $16_1$ and $16_2$. The outputs of the adaptive filters $20_1$, $20_2$ are supplied as the input to an adder $26_1$. In an echo canceller with N channels where N is any integer, such an adder is provided on each microphone channel. The sum of the output signals of the adaptive filters supplied by the adder $26_1$ is subtracted, by a subtractor $22_1$, from the signal received by the microphone $12_1$. The same operation is carried out on each microphone channel. The difference signal obtained as the output of the subtractor $22_1$ supplies a common estimation error $24_1$ to all the adaptive filters relative to the considered microphone channel; in the example of FIG. 2, the estimation error $24_1$ is common to the adaptive filters $20_1$ and $20_2$. As is the case for mono-channel echo cancellation, the coefficients of the adaptive filters are modified in an iterative manner by an appropriate algorithm, on each microphone channel, from the estimation error obtained.

It has been noted, in multi-channel cancellation, and in particular in stereophonic echo cancellation, that the convergence speed of the adaptation algorithms of the coefficients of the adaptive filters was comparatively smaller than the convergence speed of those algorithms in the case of the mono-channel echo cancellation. It has been shown that this slowing down of the convergence is the result of the fact that the sound signals received by the loudspeakers, designated by the reference numbers $16_1$ and $16_2$ in FIG. 2, are mutually correlated.

The slowing down of the convergence causes several disadvantages. In particular, in a teleconference system, the speakers located in the distant room detect over a longer time the echo of their speech during start up of the system or after an acoustic modification (movement of the listeners for example) in the room where the echo canceller is located. Moreover, in multi-channel echo cancellation, every acoustic modification in the distant room disturbs the convergence of the adaptive filters of the echo canceller, because of the mutual correlation, mentioned previously, between the speech signals received, which causes a reappearance or an increase of the echo level.

On the other hand, it has been observed in practice that when the non-mutually correlated components are present on each microphonic signal, they tend to accelerate the convergence of the multi-channel echo cancellers. An object of the present invention is to use this property of the mutually uncorrelated components to improve the performances of multi-channel echo cancellers, and to improve as a consequence the quality of the communication in the sound signal transmission systems which implement multi-channel echo cancellers. To do that, the general principle of the present invention consists of adding, to the received sound signal channels, mutually uncorrelated auxiliary signals, made inaudible by using some human auditory properties.

SUMMARY OF THE INVENTION

More exactly, the present invention proposes an echo cancellation method on N signal sound channels each having a loudspeaker and an associated microphone, N being an integer greater than or equal to 1, according to which, on each of the N channels:

(a) a synthetic signal is created having the spectral characteristics of a white noise, the spectrum of this signal extending over several adjacent frequency bands, and this synthetic signal being uncorrelated from the synthetic signals created on the other channels;

(b) for each frequency band, a frequency masking threshold is computed corresponding to the signal associated with the loudspeaker of the considered channel using properties of human auditory perception;

(c) in each frequency band, the level of the synthetic signal is brought to the value of the associated masking frequency threshold, so as to obtain an auxiliary signal;

(d) the auxiliary signal is added to the signal associated with the loudspeaker of the considered channel, the masking frequency thresholds having been previously computed so as to make the auxiliary signal inaudible, and the auxiliary signals of the N channels being mutually uncorrelated;

(e) the previously obtained signal is supplied as the input to an adaptive filter the coefficients of which form an estimation of the impulse response of the acoustic coupling path between the loudspeaker and the microphone associated with the sound signal channel considered;

(f) the signals obtained as the output of the N adaptive filters respectively associated with each microphone channel are added and the resultant signal is subtracted from the signal received by the microphone associated with this channel;

(g) an estimation error is calculated from the difference obtained at the outcome of the previous subtraction;

(h) the coefficients of the adaptive filters associated with the considered microphone are corrected as a function of the associated estimation error.

In a particular embodiment of the method, for computing each frequency masking threshold, (b1) blocks are formed each containing a pre-specified number of sound signal samples, two successive blocks mutually overlapping over a pre-specified number of samples;

(b2) the samples of each block are weighted by an apodisation window;

(b3) the Fourier transform of each block is computed;

(b4) the frequency domain is divided into several adjacent critical bands having specific lower and upper frequencies;

then, for each block and in each critical band:

(b5) the energies of the different spectrum lines belonging to the critical band are added, so as to obtain the value, for this critical band, of an energy distribution function;

(b6) the convolution product of the energy distribution function and a basilar spreading function are computed, obtained from a look-up table, so as to obtain a spread spectrum $E_i$;

(b7) a tonality index $\alpha_i$ is computed from the energies of the spectrum lines belonging to the different critical bands;

(b8) a correction factor $O_i$ is computed from the previously computed tonality index;

(b9) a frequency masking threshold $T_i$ is computed from the spread spectrum $E_i$ and from the correction factor $O_i$, the frequency masking threshold $T_i$ being defined as follows:

$$10\ \log_{10} T_i = 10\ \log_{10} e_i - O_i - C_i$$

where $C_i$ is an additional threshold correction parameter computed from several characteristics of the sound signals of the N channels.

In a particular embodiment of the method, the characteristics serving to compute the additional threshold correction parameter $C_i$ include the respective level of the signals of the N channels and a set of values of the inter-correlation function of at least some pairs of these signals, the additional correction parameter $C_i$ being a function increasing with the values of this inter-correlation function.

As a variant, the characteristics serving to compute the additional threshold correction parameter $C_i$ can include the sum of the energies contained in the various critical bands of each channel and the ratio of the energies per critical band for at least some pairs of the different channels; the more the sum of the energies contained in the various critical bands is significant and the less the ratio of the energies per critical band of a pair of channels is different between the different critical bands, then the more the additional correction parameter $C_i$ is significant.

The present invention proposes also an echo canceller with N sound signal channels each having a loudspeaker and an associated microphone, N being a integer greater than or equal to 1, including:

auxiliary signal computing means, comprising:

blocks formation means each containing a pre-specified number of sound signal samples, two successive blocks mutually overlapping on a pre-specified number of samples;

means for weighting the samples of each block by an apodisation window, located at the output of the blocks formation means;

means for computing a Fourier transform, located at the output of the weighting means;

means for computing the lower and upper frequency values of adjacent critical bands, or a look-up table containing these values;

means for computing an energy distribution function on the critical bands, the value, in a given critical band, of the energy distribution function being computed by adding the energy of the different spectrum lines belonging to this critical band;

a second look-up table, containing values representing the basilar spreading functions each associated with a given critical band;

means for computing a spread spectrum $E_i$, by computing, for a given critical band, the convolution product of the energy distribution function and the spreading function associated with this critical band;

means for computing a correction factor $O_i$ associated with a given critical band;

means for computing a frequency masking threshold $T_i$ associated with a given critical band, from a spread spectrum and from a correction factor $O_i$ associated with this critical band, the frequency masking threshold $T_i$ being defined as follows:

$$10\ \log_{10} T_i = 10\ \log_{10} E_i - O_i - C_i$$

where $C_i$ is an additional threshold correction parameter;

means for generating synthetic signals having the spectral characteristics of a white noise;

control means, connected to the N sound signal channels, for computing for each critical band the additional threshold correction parameter Ci from several sound characteristics of the N channels;

means for bringing the level of a synthetic signal to the value of the associated frequency masking threshold so as to obtain an auxiliary signal;

means for computing an inverse Fourier transform;

memory means for storing the result of the processing of the successive blocks;

means for combining the result of the processing of a block with the result of the processing of the previous block;

means for sequential reading connected to the memory means, in order to pass the rate of data from the block rate to the sample rate;

N first adder means respectively placed on the N sound signal channels, for adding on each channel the received sound signal and the associated auxiliary signal;

N×N adaptive filtering means, including N adaptive filtering means associated with each of the N microphone channels, and each having coefficients which form an estimation of the impulse response of the acoustic coupling path between the loudspeaker and the microphone associated with one of the N sound signal channels;

second adder means, connected to the output of the N adaptive filtering means associated with each microphone channel, for adding the output signals from these N adaptive filtering means;

N subtractor means, each placed at the output of the second adder means and connected respectively to the microphones of the N sound signal channels, for subtracting on each channel the signal obtained at the output of the second adder means from the signal received by the microphone of this channel;

N means for computing on each channel an estimation error from the result supplied by the subtractor means connected to the microphone of this channel;

N means for correcting in an iterative manner the respective coefficients of the N adaptive filtering means associated with each of the N microphone channels, as a function of the estimation error associated with each microphone channel.

The implementations differ according to the applications, and in particular, the number of loudspeakers of the considered sound signals transmission system can be different from the number of microphones.

In a particular embodiment of the device, the characteristics serving to compute the additional threshold correction parameter Ci include the respective level of the signals of the N channels and a set of values of the inter-correlation function of at least some pairs of these signals, the additional correction parameter Ci being a function increasing with the values of this inter-correlation function.

As a variant, the characteristics serving to compute the additional threshold correction parameter Ci can include the sum of the energies contained in the various critical bands of each channel and the ratio of the energies per critical band of at least some pairs of the different channels; the more the sum of the energies contained in the various critical bands is significant and the less the ratio of the energies per critical band of a pair of channels is different between the different critical bands, then the more the additional correction parameter Ci is significant.

In a particular embodiment of the device, the echo canceller further comprises means for computing a tonality index $\alpha i$ from the energies of the spectral lines belonging to the different critical bands, the means for computing the correction factor Oi computing the correction factor Oi from the tonality index $\alpha i$.

In a particular embodiment of the device, the means for computing the tonality index supply a constant tonality index, identical for all the critical bands and defined by:

$$\alpha i = \alpha = \min(SFM/SFM\max, 1)$$

where min(a, b) designates the smallest of the values a and b, where SFMmax is a parameter of pre-specified value in dB associated with a pure sinusoidal signal and, where SFM=10 $\log_{10}$G/A where $\log_{10}$ designates the logarithm to base 10, G designates the geometric mean of the energy over a pre-specified number of points of the Fourier transform and A designates its arithmetic mean over the same number of points.

In a particular embodiment, SFMmax=−60 dB.

In a particular embodiment, the means for computing the correction factor Oi supply a correction factor Oi defined by:

$$Oi = \max(SO, \alpha i.(k1+Bi)=(1-\alpha i).k2)$$

where max(a, b) designates the largest of the values a and b, where SO, k1 and k2 are pre-specified parameter values in dB, where $\alpha i$ is the tonality index associated with the considered critical band, and where Bi designates the frequency of the critical band in Bark.

In a particular embodiment of the device, SO=24.5 dB, k1=14.5 dB and k2=5.5 dB.

BRIEF DESCRIPTION OF THE DRAWINGS

Other characteristics and advantages of the present invention will appear in the reading of the following detailed description of particular embodiments, given by way of non limiting examples. The description refers to the appended drawings, in which.

DETAILED DESCRIPTION OF PREFERRED EMBODIMENTS

The method and the device of the present invention apply to any sound signal. By way of non limiting example, it may be a speech signal as well as a music signal.

Figure 3:
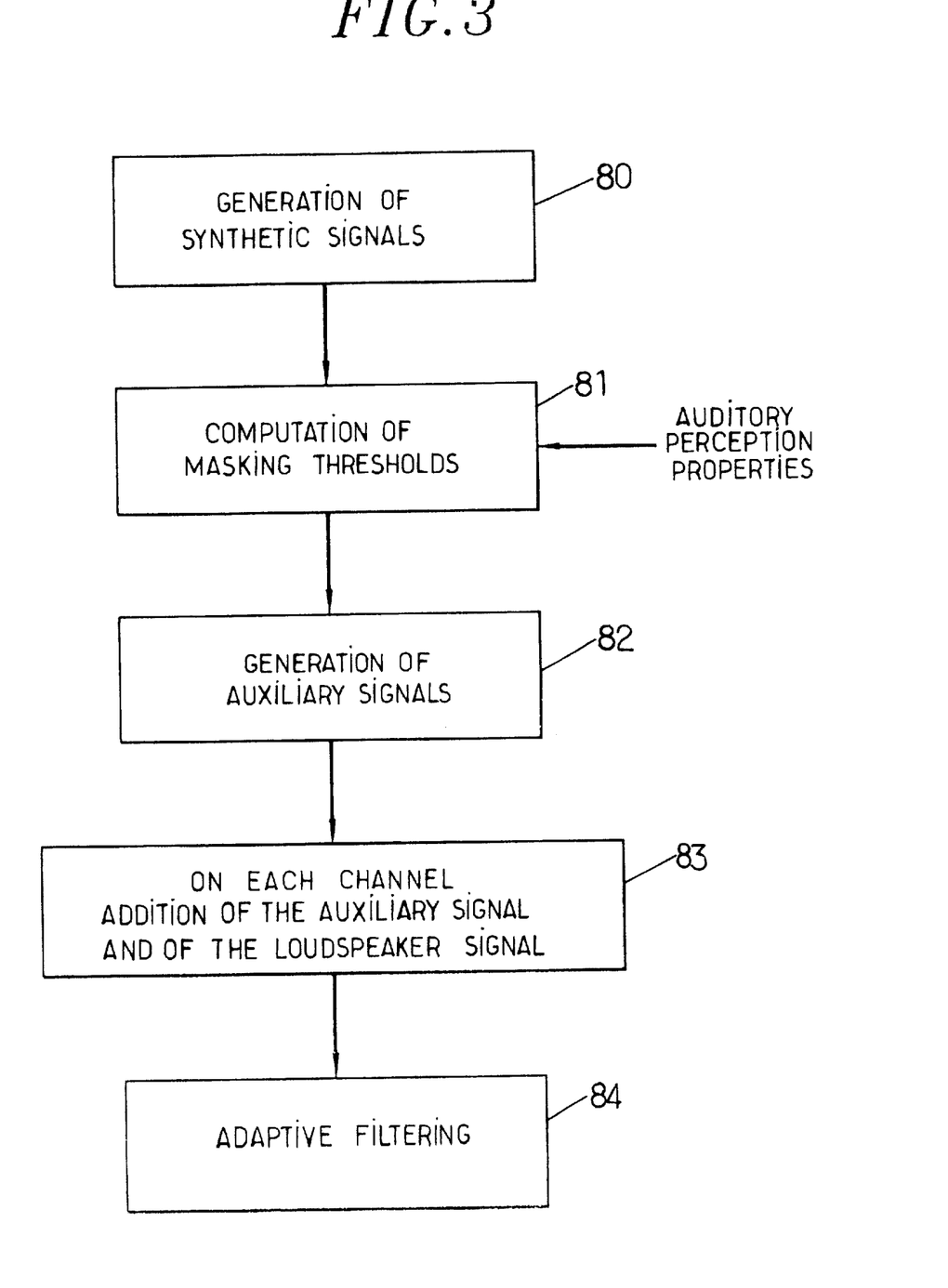
FIG. 3 is a flow chart describing the general succession of the stages of the method of the present invention in a particular embodiment.

The general organization of the multi-channel echo cancellation method is first described in a particular embodiment, with reference to FIG. 3, starting at stage 80 by a generation of synthetic signals.

N sound signal channels are considered each of which comprises a loudspeaker and a microphone.

On each received sound signal channel, first of all a signal having the spectral characteristics of a white noise, and the spectrum of which extends over several adjacent frequency bands, is synthesised, the synthetic signals of the N channels being mutually uncorrelated.

Next, for each frequency band, a frequency masking threshold corresponding to the sound signal received by the loudspeaker of the considered channel is computed.

It is to be reminded that the masking effect consists in that a sound in the presence of another may become partially or completely inaudible. When this phenomenon occurs in the frequency domain, it is called simultaneous masking or frequency masking. There is a threshold, called the frequency masking threshold, below which all the frequency components of a masked sound are inaudible. For more detail on the masking phenomenon, reference will be usefully made to the work by E. ZWICKER and R. FELDT-KELLER entitled "Das Ohr als Nachrichtenempfänger", Stuttgart, West Germany, Hirzel Verlag, 1967.

In a particular embodiment, the computation of the frequency masking thresholds is carried out as follows. First of all, the rate of the sound signal data flow is transformed, passing from a sample rate, for example of 16 kHz, to a block rate, each block having for example a duration of 32 ms. Each block contains therefore a pre-specified number of samples. Two successive blocks mutually overlap over a pre-specified number of samples, for example over a duration of 16 ms.

Next, in order to improve the subsequent estimation of the spectrum, the samples of each block are weighted by an apodisation window, for example of the Hamming or Hanning window type.

Then the Fourier transform of each block is computed over a pre-specified number of points, for example 512 points for blocks of 32 ms. For this purpose a fast Fourier transform algorithm may be used.

Next the domain of the frequencies to which the received sound signal is likely to belong is divided into several adjacent frequency bands having specific lower and upper frequencies. These frequency bands are called critical bands. The table below supplies, by way of non limiting example, the breakdown of the domain of speech frequencies into critical bands (lower and upper limits and central frequencies) set up by E. ZWICKER and R. FELDT-KELLER and appearing in the aforementioned work. The width of each critical band is by conventional equal to 1 Bark. The table gives therefore the correspondence between the frequency scale in Hertz and that of Bark.

| Critical band No. | Lower limit (Hz) | Centre (Hz) | Upper limit (Hz) |
|---|---|---|---|
| 1 | 0 | 50 | 100 |
| 2 | 100 | 150 | 200 |
| 3 | 200 | 250 | 300 |
| 4 | 300 | 350 | 400 |
| 5 | 400 | 450 | 510 |
| 6 | 510 | 570 | 630 |
| 7 | 630 | 700 | 770 |
| 8 | 770 | 840 | 920 |
| 9 | 920 | 1000 | 1080 |
| 10 | 1080 | 1170 | 1270 |
| 11 | 1270 | 1370 | 1480 |
| 12 | 1480 | 1600 | 1720 |
| 13 | 1720 | 1850 | 2000 |
| 14 | 2000 | 2150 | 2320 |
| 15 | 2320 | 2500 | 2700 |
| 16 | 2700 | 2900 | 3150 |
| 17 | 3150 | 3400 | 3700 |
| 18 | 3700 | 4000 | 4400 |
| 19 | 4400 | 4800 | 5300 |
| 20 | 5300 | 5800 | 6400 |
| 21 | 6400 | 7000 | 7700 |
| 22 | 7700 | 8500 | 9500 |
| 23 | 9500 | 10500 | 12000 |
| 24 | 12000 | 13500 | 15500 |

Instead of applying a Fourier transform as described above, as a variant, a breakdown by banks of filters may be used, which enables the breakdown into critical bands to be directly obtained.

The following stage consists in adding the energy of the different spectrum lines belonging to each critical band, so as to obtain the value, in this critical band, of an energy distribution function.

Next the spread spectrum Ei, defined as the convolution product of the function giving the energy distribution per critical band with the function called basilar spreading, is computed. The basilar spreading function Eb corresponds to the energy frequency response of the basilar membrane of the human ear. It represents the excitation resulting from the perception of a tonal, i.e. of a pure sound frequency, and may be defined by the following equation, appearing also in the aforementioned work by E. ZWICKER and R. FELDT-KELLER:

10. $\log_{10} Eb = 15.81 + 7.5(B+0.474) - 17.5(1+(B+0.474)^2)^{1/2}$ where $\log_{10}$ represents the logarithm to base 10 and B is the frequency in Bark. In the particular embodiment described, the values of this function are read in a look-up table.

It has been shown experimentally that it is more difficult to mask a noise by a tonal than the reverse. In order to take account of this asymmetry of the masking thresholds, to each threshold is applied a correction factor Oi associated with a given critical band Bi and which depends on the tonal or non tonal aspect of the sound signal. In order to evaluate this tonal or non tonal aspect, in a particular embodiment, a measure called SFM (Spectral Flatness Measure) is used, which measure is defined as the ratio between the geometric mean of the energy over a pre-specified number of points of the Fourier transform and its arithmetic mean over the same number of points, for example 256 points for a Fourier transform computed over 512 points.

The SFM value obtained is compared with that of a pure sinusoidal signal, for which, by way of non limiting example, by convention can be written SFM=SFMmax=−60 dB.

Then a tonality index $\alpha i$ may be computed, which, in a particular embodiment, is constant and identical for all the critical bands and defined by:

$$\alpha i = \alpha = \min(SFM/SFM\max, 1)$$

where min (a, b) designates the smallest of the values a and b. The index $\alpha i$ is between 0 and 1 and is higher for the tonal components of the signal than for the non tonal components. Any other method of computing the tonality index judged appropriate is conceivable.

The correction factor Oi associated with the critical band of frequency Bi in Bark is defined from the tonality index $\alpha i$ as follows:

$$Oi = \max(SO, \alpha i.(k1+Bi)+(1-\alpha i).k2)$$

where max (a, b) designates the largest of the values a and b and where SO, k1 and k2 are parameters of pre-specified values in dB. Typically, SO=24.5 dB, k1=14.5 dB and k2=5.5 dB can be chosen.

The correction factor Oi is a function increasing with the rank of the critical band in the case of prevailing tonal components and gives more weight to these tonal components than to the non tonal components.

Moreover an additional correction parameter Ci is applied to the masking thresholds, which parameter Ci is computed from several characteristics of the sound signals of the N channels. The parameter Ci may be common to all the masking thresholds corresponding to the different critical bands, or have a specific value for each critical band.

In a particular embodiment, the additional threshold correction parameter Ci is computed from the sound signal levels received on the N channels and a set of values of the inter-correlation function from at least some pairs of these signals. In this particular embodiment, the additional threshold correction parameter Ci is a function increasing with the values of the inter-correlation function.

By way of non limiting example, in a typical practical teleconference installation with several microphones and several loudspeakers, the microphones are placed so that the correlation between picked up signals is significant between two adjacent microphones and low between distant microphones. This variable correlation also occurs, with possible modifications due to the processing during the transmission, in the reception, between adjacent channels on the one hand, i.e. between two directly neighbouring loudspeakers, and between distant channels on the other hand, i.e., between the other pairs of distant loudspeakers.

In this way the computation of the parameters Ci can be limited to using the characteristics of the level and the inter-correlation of the pairs of channels corresponding to the pairs of directly neighbouring loudspeakers and to the two adjacent pairs (if these latter exist, taking account of the total number of loudspeakers). Thus, if a pair of directly neighbouring loudspeakers (HPk, HPk+1) are considered, their level and inter-correlation characteristics will be used as well as those of adjacent pairs (HPk−1, HPk) (HPk−1 and HPk being directly neighbouring) and (HPk+1, HPk+2) (HPk+1 and HPk+2 being directly neighbouring).

In another embodiment, the additional correction parameter Ci is computed from the sum of the energies contained in the various critical bands of each channel and the ratio of the energies per critical band of at least some pairs of the different channels.

In a way similar to the previous embodiment, this can be limited to using the characteristics of energy sum and energy ratio of the pairs of channels corresponding to the pairs of directly neighbouring loudspeakers and to the two adjacent pairs. The more the sum of the energies contained in the various critical bands is significant and the less the ratio of the energies per critical band of one pair of channels is different between the different critical bands, then the more the parameter Ci is significant.

Thus, when the inter-correlation between the sound signals of two given channels is strong, and/or these two signals have comparable energies, the parameter Ci is high, i.e. a significant reduction of the threshold is applied, typically from 6 to 10 dB. On the other hand, when the signals are little correlated and/or are of appreciably different energies, a less significant reduction of the threshold is applied, typically from 0 to 6 dB. This correction takes account of the auditory properties. It has the object of making inaudible the auxiliary signals mentioned in the introduction and the obtaining of which is detailed hereafter, while enabling to give them the highest possible level.

For each block and in each critical band, the frequency masking threshold Ti is obtained at stage 81 of FIG. 3 from the spread spectrum Ei and from the correction factor Oi defined previously, and from the additional threshold correction factor Ci, as follows:

$$10 \log_{10} Ti = 10 \log_{10} Ei - Oi - Ci$$

As FIG. 3 shows, the following stage 82 of the method consists in obtaining, on each channel, an auxiliary signal. To do that, in a particular embodiment, into each critical band the level of the synthetic signal is brought to the value of the associated frequency masking threshold.

The inverse Fourier transform corresponding to the result of the processing of the current block is then computed, for example by means of an inverse fast Fourier transform algorithm. In the case where a Fourier transform has not been used, but a breakdown by filter banks, as described previously, a synthesis stage corresponding to an inverse transformation of the breakdown by filter banks is carried out, in place of an inverse Fourier transformation.

Next the result of the processing of the previous blocks is combined with the result of the processing of the current block, in order to reconstruct the current masked noise block, for example by means of a known method of "overlap-add" or "overlap-save" synthesis.

Next the block rate is again passed to the sample rate.

All steps described previously may be carried out by a signal processor in real time.

In particular embodiment, the following stage 83 of the method consists, on each channel, of adding the obtained auxiliary signal to the signal associated with the loudspeaker of this channel, as shown in FIG. 3. By construction, the auxiliary signals of the N channels are mutually uncorrelated and, since the auxiliary signals do not exceed the associated frequency masking thresholds, they are inaudible.

In the embodiment described, each auxiliary signal is added to the associated loudspeaker signal after having been reformed in its entirety from the different critical bands. As a variant, this addition can quite as well be carried out in each of the different critical bands.

Next a global adaptive filtering stage 84 is carried out, as shown in FIG. 3. This stage is detailed below in a particular embodiment.

First of all the sum of the auxiliary signal and the loudspeaker signal is supplied as the input to an adaptive filter the coefficients of which form an estimation of the impulse response of the acoustic coupling path between the loudspeaker and the microphone associated with the considered sound signal channel.

This procedure is followed on each channel, then the signals obtained at the output of the N adaptive filters associated with each microphone channel are added. Next the resultant signal, on each microphone channel, is subtracted from the signal received by the microphone associated with this channel.

From the difference signal thus obtained, on each microphone channel an estimation error is computed and the coefficients of the adaptive filters associated with this microphone channel are computed as a function of this estimation error.

The adaptive filtering stage detailed above is carried out in the time domain. As a variant, the adaptive filtering can be carried out by blocks and not by samples, in particular by carrying out the whole of the corresponding processing in the Fourier domain. For a description of frequency adaptive filtering methods, reference will be usefully made to the article by J. PRADO and E. MOULINES entitled "Frequency domain adaptive filtering with applications to acoustic echo cancellation", Annales des Télécommunications, 49, no. 7–8, 1994, pages 414–428.

In the following is described a particular embodiment of an echo canceller according to the present invention, with reference to FIGS. 4 and 5.

In this particular embodiment, the number of loudspeakers is identical to the number of microphones. However, various implementations are possible according to the applications, and in particular, the number of loudspeakers can be different from the number of microphones.

Figure 4:
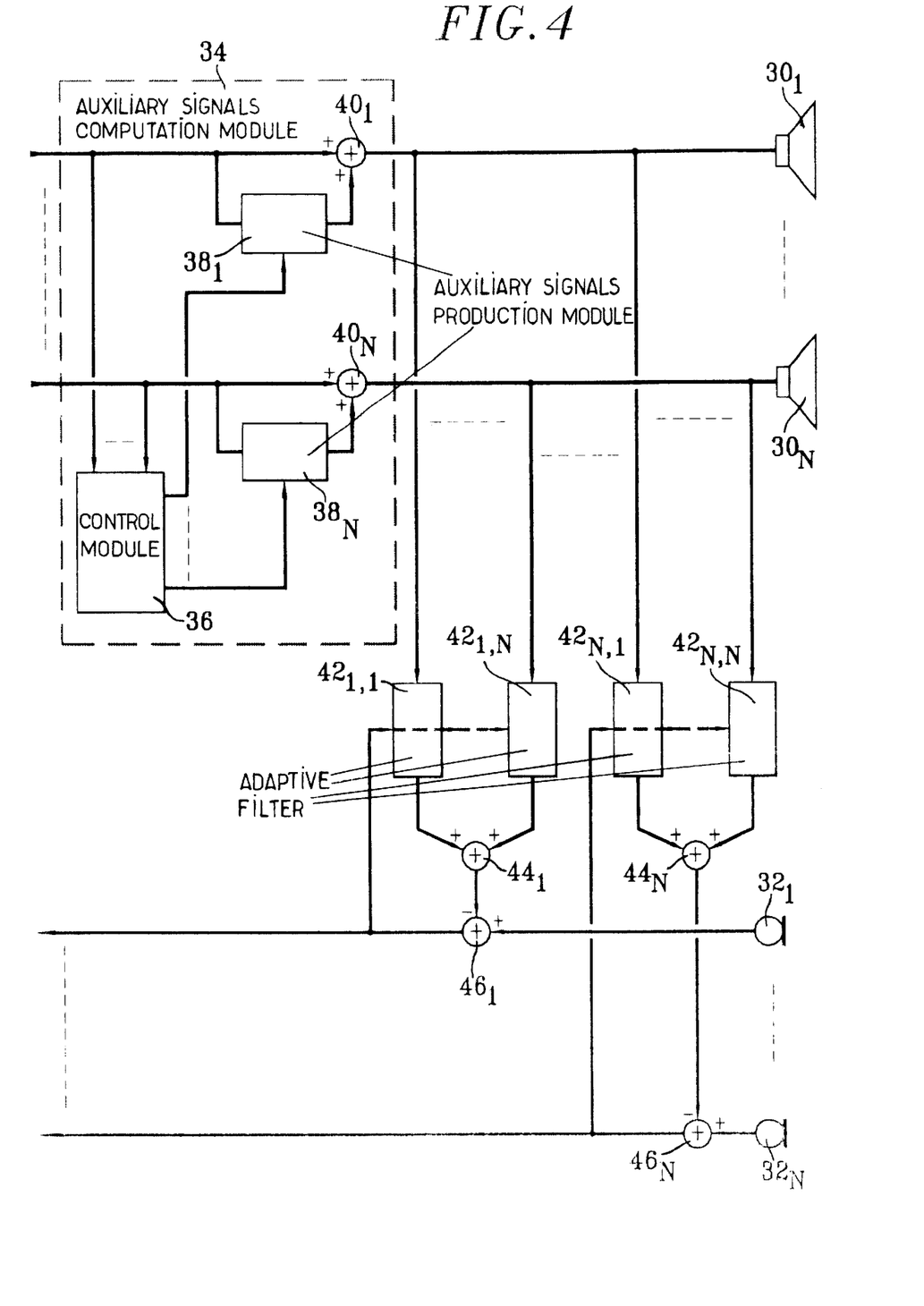
FIG. 4 shows diagrammatically the device of the present invention in a particular embodiment.

As shown in FIG. 4, the echo canceller is associated with N loudspeakers $30_1, \ldots, 30_N$ and N microphones $32_1, \ldots, 32_N$. It includes an auxiliary signals computation module 34 the detailed structure of which will be described with reference to FIG. 5. In an overall way, the auxiliary signals computation module 34 includes a control module 36 connected to the N loudspeaker channels, N auxiliary signals production modules $38_1, \ldots, 38_N$ respectively connected to the N loudspeaker channels and to the control module 36, and N first adder modules $40_1, \ldots, 40_N$ respectively placed on the N loudspeaker channels and each receiving as input the sound signal received on the considered channel and the output signal from the auxiliary signals production module associated with this channel.

The echo canceller shown in FIG. 4 includes moreover N×N adaptive filtering modules $42_{ij}$ where i and j are integers varying from 1 to N, the N adaptive filtering modules $42_{i,1}, \ldots, 42_{i,N}$ being associated with the ith microphone channel, $1 \leq i \leq N$, and being respectively associated with the N loudspeaker channels, as FIG. 4 shows. For the ith microphone channel, $1 \leq i \leq N$. the outputs of the N adaptive filtering modules $42_{i,1}, \ldots, 42_{i,N}$ are connected to a second adder module $44_i$. The output of each second adder module $44_i$, $1 \leq i \leq N$, is connected to the subtracting input of a subtractor module $46_i$, receiving on its non subtracting input the signal received by the ith microphone $32_i$. The output of each subtractor module $46_i$ controls the set of the N adaptive filtering modules $42_{i,1}, \ldots, 42_{i,N}$, through a module (not shown) for calculating an estimation error on the basis of the result output by the subtractor module $46_i$, and through a module (not shown) for correcting in an iterative manner the coefficients of the N adaptive filtering modules $42_{i,1}, \ldots, 42_{i,N}$ as a function of the obtained estimation error.

Figure 5:
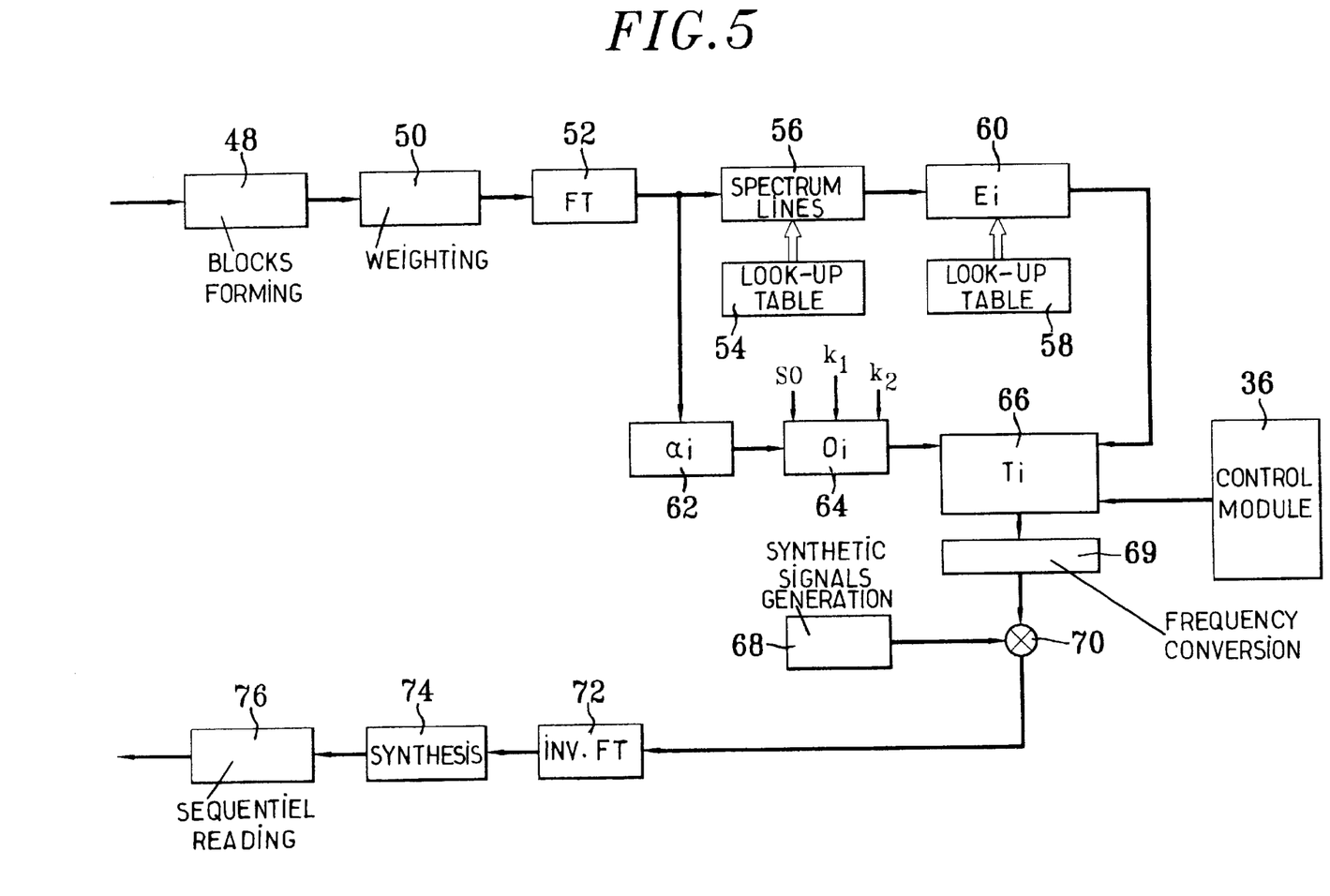
FIG. 5 shows diagrammatically the structure of the auxiliary signal computing module included in the device of the present invention, in a particular embodiment.

FIG. 5 shows in more detail the structure of the subassembly of the auxiliary signals computing module 34 formed by the control module 36 and the N auxiliary signals production modules $38_1, \ldots, 38_N$.

The sound signal received on a given loudspeaker channel is supplied as input to a blocks formation module 48. The module 48 outputs blocks each containing a pre-specified number of samples of the received sound signal. Two successive blocks mutually overlap on a pre-specified number of samples. The numerical examples given in the description of a particular embodiment of the method remain valid.

The blocks formation module 48 is connected to a weighting module 50 which applies to each block an apodisation window, for example of the Hamming or Hanning window type.

The weighting module 50 is connected to a Fourier transform computation module 52. By way of non limiting example, the module 52 may carry out a fast Fourier transform on 512 points.

The auxiliary signals computation module 34 also includes a module 54 for computing the lower and upper frequency values of adjacent critical bands covering the frequency range to which the received sound signal belongs. As a variant, the module 54 may consist of a look-up table containing these values.

The module 54 is connected to a module 56 for computing the energy distribution functions. The input of the module 56 is also connected to the Fourier transform computing module. The module 56 computes and adds the energies of the different spectrum lines belonging to each critical band by using the values of the limit frequencies of the critical bands supplied by the module 54. The module 56 outputs, for each critical band, the value of an energy distribution function.

A second look-up table 58 contains values representing the basilar spreading functions each associated with a given critical band. The definition of these functions has been given above in relation to a particular embodiment of the method.

The second look-up table 58 is connected to the input of a module 50 enabling a spread spectrum Ei to be computed. The input of the module 60 is also connected to the energy distribution functions computing module 56. The module 60 computes, for a given critical band, the convolution product of the energy distribution function and the spreading function, so as to output the spread spectrum for this critical band.

In the particular embodiment shown in FIG. 5, the auxiliary signals computing module 34 further includes a module 62 for computing tonality indices αi respectively associated with given critical bands. The module 62 is connected to the output of the Fourier transform computing module 52 and uses the values of the energies of the spectrum lines belonging to the different critical bands.

In this particular embodiment, the module 62 for computing the tonality indices is connected to a module 64 for computing correction factors Oi respectively associated with given critical bands. the module 64 computes the correction factors Oi from the tonality indices αi.

In a particular embodiment, the tonality indices computation module 62 supplies a constant tonality index αi, identical for all the critical bands, defined by:

$\alpha i = \alpha = \min(SFM/SFM\max, 1)$ where min(a, b) designates the smallest of the values a and b, where SFMmax is a parameter of pre-specified value in dB associated with a pure sinusoidal signal, and where SFM=10 $\log_{10} G/A$ where $\log_{10}$ designates the logarithm to base 10, G designates the geometric mean of the energy over a pre-specified number of points of the Fourier transform and A designates its arithmetic mean over the same number of points. In this embodiment, the correction factors Oi computation module 64 outputs for each critical band a correction factor Oi defined by:

$$Oi = \max(SO, \alpha i.(k1+Bi)+(1-\alpha i).k2)$$

where max(a, b) designates the largest of the values a and b, where SO, k1 and k2 are parameters of pre-specified value in dB, where $\alpha i$ is the tonality index associated with the considered critical band, and where Bi designates the frequency of the critical band in Bark.

By way of non limiting example, the parameters SFMmax, SO, k1 and k2 can have numerical values indicated above in relation to a particular embodiment of the method.

The correction factors Oi computing module 64 and the spread spectrum computing module 60 are connected to the input of a module 66 for computing frequency masking thresholds Ti, respectively associated with given critical bands. The module 66 outputs for each critical band a frequency masking threshold Ti defined as follows:

$$10 \log_{10} Ti = 10 \log_{10} Ei - Oi - Ci$$

where Ei is the spread spectrum and Oi is the correction factor associated with this critical band, and where Ci is an additional threshold correction parameter.

The parameter Ci is supplied by the control module 36 mentioned above. The connections of the module 36 to the N loudspeaker channels, shown in FIG. 4, have been omitted in FIG. 5 for more clarity.

In a particular embodiment, the control module 36 computes the additional threshold correction parameter Ci for each critical band from the respective level of the signals from the N channels and a set of values of the inter-correlation function of at least some pairs of these signals, as has been described above according to a particular embodiment of the method. It has been seen that in this case, the parameter Ci is a function increasing with the values of the inter-correlation function.

In another particular embodiment, the control module 36 computes the parameter Ci for each critical band from the sum of the energies contained in the various critical bands of each channel and from the ratio of the energies per critical band of at least some pairs of the different channels, as has also been described in relation to a particular method embodiment. It has been seen that in this case, the more the sum of the energies contained in the various critical bands is significant and the less the ratio of the energies per critical band of a pair of channels is different between the different critical bands, then the more the parameter Ci is significant.

The auxiliary signal computing module 34 comprises in addition a synthetic signals generation module 68. The module produces for each sound signal channel, a signal having the spectral characteristics of a white noise and uncorrelated from the synthetic signals produced for the other channels.

The output of the frequency masking threshold computing module 66 is connected to a frequency conversion module 69. The module 69 carries out the conversion of the masking thresholds supplied by the module 66 from Bark into Hertz.

A module 70 receives as input the synthetic signals produced by the module 68 and the frequency masking thresholds calculated by the module 66 and converted by the module 69. The module 70 brings the level of each synthetic signal to the value of the associated frequency masking threshold, so as to obtain an auxiliary signal.

The output of the module 70 is connected to the input of an inverse Fourier transform computing module 72.

The output of the module 72 is connected to the input of a synthesis module 74. The synthesis module 74 is connected to a random access memory (not shown) which stores the result of the processing of the blocks of successive samples. The synthesis module 74 combines the result of the processing of a block with the results of the processing of the previous block supplied by the random access memory, for example by implementing an "overlap-add" or "overlap-save" synthesis method.

A sequential reading module 76 is connected to the synthesis module 74 and to the random access memory, and ensures the passage of the data rate from the blocks rate to the samples rate.

The modules 48 to 76 which have just been described is equivalent to the series of auxiliary signals production modules $38_1, \ldots, 38_N$ shown in a simplified way in FIG. 4. Indeed, each of the modules 48 to 76 contributes toward producing an auxiliary signal for each loudspeaker channel.

In this way, the present invention enables an auxiliary signal of maximum level to be injected at each instant on each received sound signal channel, ensuring effectively the increase of the convergence speed, and for which the level is made by construction smaller than the level of masking by the received sound signal.

The method and the device of the present invention also apply to mono-channel echo cancellation (case N=1), in order to improve the convergence of the adaptive filter.

They are applicable to all types of acoustic echo cancellation, in particular just as well in the time domain as in the frequency domain, or in sub-bands.

FIGS. 6a, 6b and 7a, 7b show two examples of comparative results obtained by means of the echo cancelling method and device according to a particular embodiment of the present invention.

The graphs of FIGS. 6a to 7b all include two curves. The dashed curves concern the right stereophonic channel and the dotted curves concern the left stereophonic channel. The algorithm used for the adaptation of the coefficients of the adaptive filters is the stochastic normalised gradient algorithm (NLMS). The adaptive filters have a size of 1024 coefficients. The axis of the abscissas shows the number of iterations of the adaptation algorithm, divided by a factor of 256. The axis of the ordinates shows the relative difference, in dB, between the actual impulse responses of the acoustic coupling paths and the impulse responses of the adaptive filters of a stereophonic echo canceller.

Figure 6A:
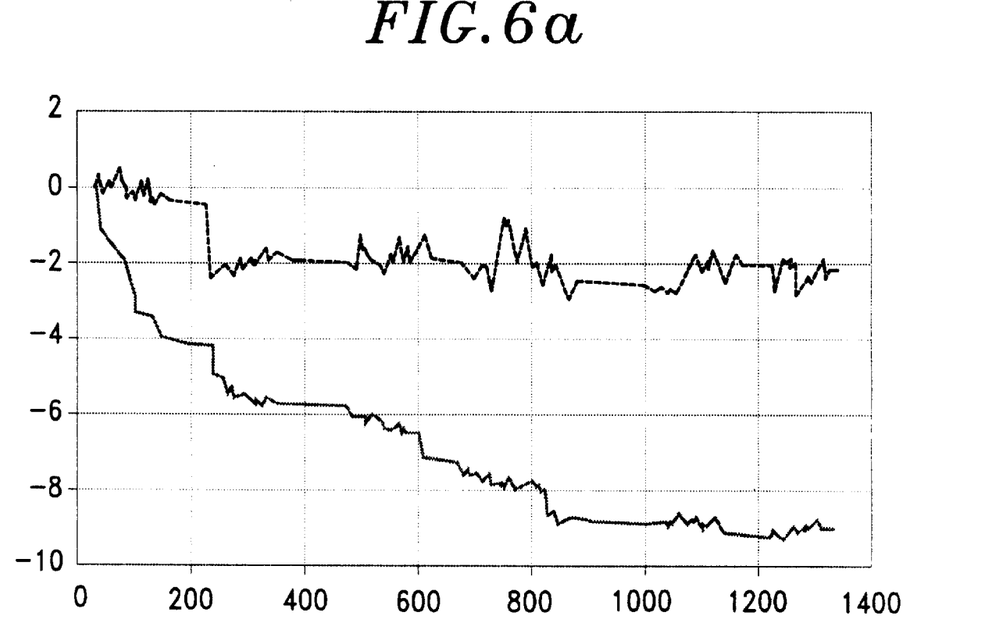
FIG. 6a is a graph illustrating a first example of the evolution, as a function of time, of the relative difference between the actual impulse responses of the acoustic coupling paths and the impulse responses estimated by the adaptive filters of a stereophonic echo canceller in accordance with a particular embodiment of the present invention.
Figure 6B:
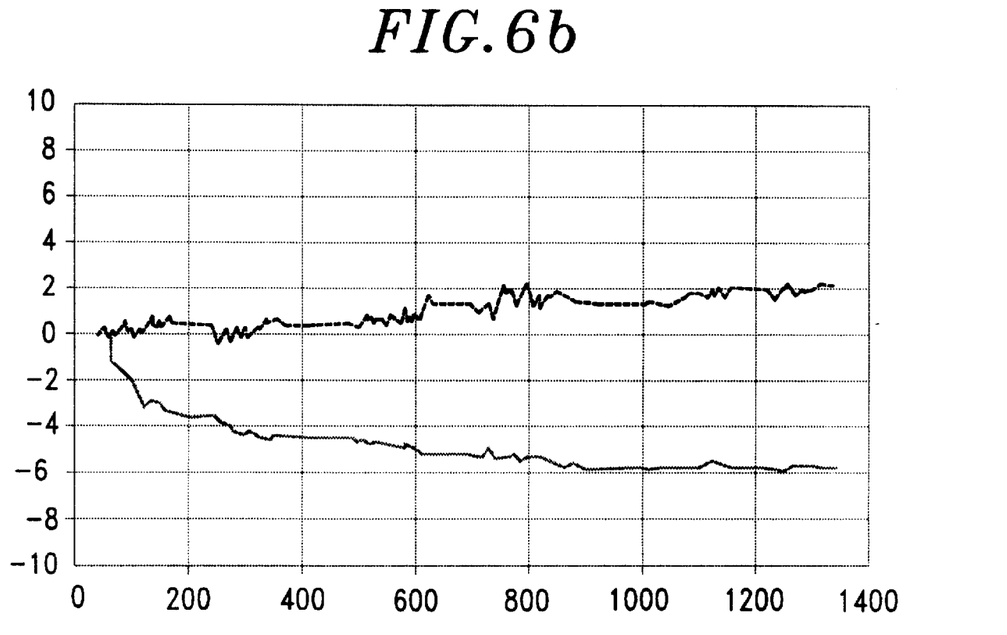
FIG. 6b is a graph similar to that of FIG. 6a, drawn for a conventional stereophonic echo canceller.

The first comparative example, illustrated by FIGS. 6a and 6b, corresponds to a male speaker. The adaptation pitch of the NLMS algorithm is 0.25. FIG. 6a shows the relative difference obtained by using the present invention and FIG. 6b shows the relative difference obtained by using a conventional echo cancelling method and device, in particular not using auxiliary signals.

Figure 7A:
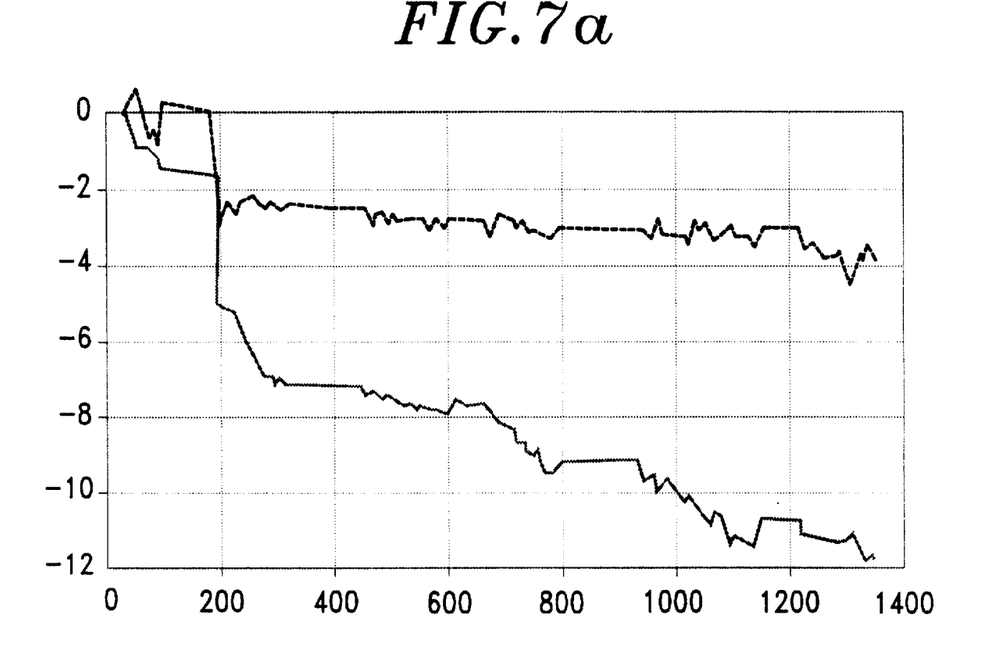
FIG. 7a is a graph illustrating a second example of the evolution, as a function of time, of the relative difference between the actual impulse responses of the acoustic coupling paths and the impulse responses estimated by the adaptive filters of a stereophonic echo canceller in accordance with a particular embodiment of the present invention.
Figure 7B:
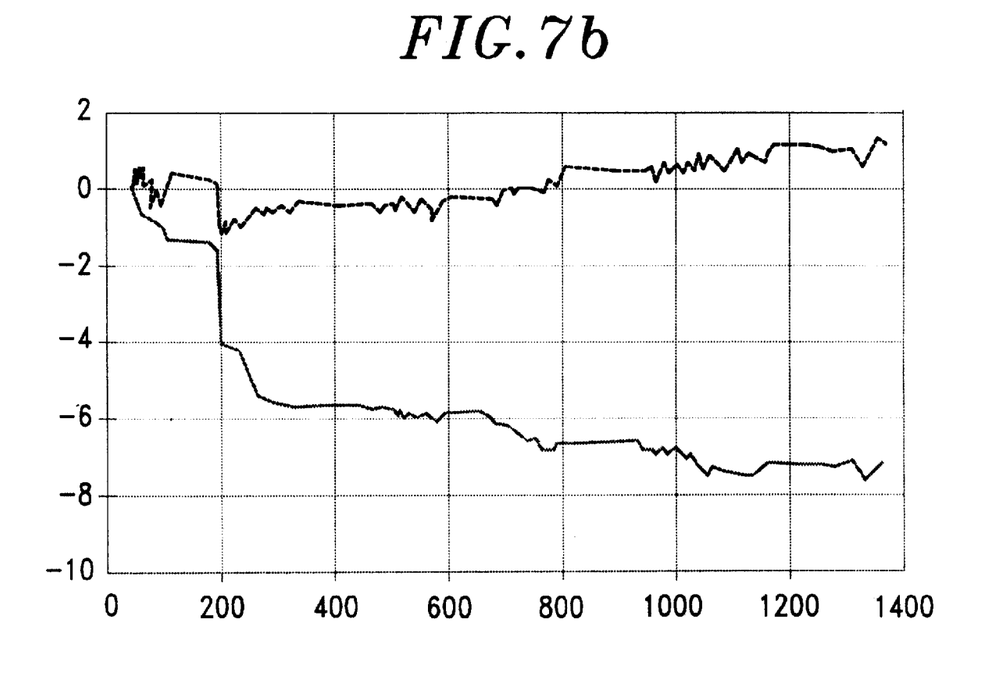
FIG. 7b is a graph similar to that of FIG. 7a, drawn for a conventional stereophonic echo canceller.

The second comparative example, illustrated by FIGS. 7a and 7b, corresponds to a female speaker. The adaptation pitch of the NLMS algorithm is 0.125. FIGS. 7a and 7b are the respective analogues of FIGS. 6a and 6b.

In the two comparative examples, the use of the present invention always ensures a relative difference less than 1 (i.e. dB negative), which is not the case of the conventional method and device for the right channel (dashed curve).

Moreover, in the case of use of the present invention, the difference on the left channel (dofted curve) is less by several dB than the difference observed on the curves corresponding to the conventional method and device. Therefore, the present invention shows superior performances, enabling to ensure a good performance in adaptation of the echo canceller in the presence of variations of the acoustic coupling paths.

Furthermore, in the two examples, the correction applied to the masking thresholds is 10 dB. A reduction of some dB of this correction may be admitted, which would further improve the performances of the proposed method and device, whereas the perceived speech, although slightly modified by the added noise, would maintain a quite acceptable quality in an application such as teleconference.

We claim:

1. An echo cancellation method on N sound signal channels each having a loudspeaker and an associated microphone, N being an integer greater than or equal to 1, according to which, on each of the N channels:
    (a) a synthetic signal is created having the spectral characteristics of a white noise, the spectrum of this signal extending over several adjacent frequency bands, and this synthetic signal being uncorrelated with the synthetic signals created on the other channels;
    (b) for each frequency band, a frequency masking threshold is computed corresponding to the signal associated with the loudspeaker of the considered channel by using properties of human auditory perception;
    (c) in each frequency band, the synthetic signal level is brought to the value of the associated frequency masking threshold, so as to obtain an auxiliary signal;
    (d) the auxiliary signal is added to the signal associated with the loudspeaker of the considered channel, the frequency masking thresholds having been previously computed so as to make the auxiliary signal inaudible, and the auxiliary signals of the N channels being mutually uncorrelated;
    (e) the signal obtained in step (d) is supplied as input to an adaptive filter the coefficients of which form an estimation of the impulse response of the acoustic coupling path between the loudspeaker and the microphone associated with the sound signal channel considered;
    (f) the signals obtained as output from the N adaptive filters associated with each microphone channel are added and the resultant of the signal is subtracted from the signal received by the microphone associated with this channel;
    (g) an estimation error is computed from the difference obtained at the outcome of the previous subtraction;
    (h) the coefficients of the adaptive filters associated with the considered microphone channel are corrected as a function of the associated estimation error.

2. A method according to claim 1, wherein, in order to compute each frequency masking threshold,
    (b1) blocks are formed each containing a pre-specified number of sound signal samples, two successive blocks mutually overlapping over a pre-specified number of samples;
    (b2) the samples of each block are weighted by an apodisation window;
    (b3) the Fourier transform of each block is computed;
    (b4) the frequency range is divided into several adjacent critical bands having specified lower and upper frequencies;

then, for each block and in each critical band:
    (b5) the energies of the different spectrum lines belonging to the critical band are added, so as to obtain the value, for this critical band, of an energy distribution function;
    (b6) the convolution product of the energy distribution function and a basilar spreading function is computed, obtained from a look-up table, so as to obtain a spread spectrum $E_i$;
    (b7) a tonality index $\alpha_i$ is computed from the energies of the spectrum lines belonging to the different critical bands;
    (b8) a correction factor $O_i$ is computed from the tonality index previously computed;
    (b9) a frequency masking threshold $T_i$ is computed from the spread spectrum $E_i$ and from the correction factor $O_i$, the frequency masking threshold $T_i$ being defined as follows:

$$10 \log_{10} T_i = 10 \log_{10} E_i - O_i - C_i$$

where $C_i$ is an additional threshold correction parameter computed from several characteristics of the sound signals from the N channels.

3. A method according to claim 2, wherein the characteristics serving to compute said additional threshold correction parameter $C_i$ include the respective level of the signals of the N channels and a set of values of the inter-correlation function from at least some pairs of these signals, said additional correction parameter $C_i$ being a function increasing with the values of this inter-correlation function.

4. A method according to claim 2, wherein the characteristics serving to compute said additional threshold correction parameter $C_i$ include the sum of the energies contained in the various critical bands of each channel and the ratio of the energies per critical band of at least some pairs of the different channels, wherein the more the sum of the energies contained in the various critical bands is significant and the less the ratio of the energies per critical band of a pair of channels is different between the different critical bands, then the more said additional correction parameter $C_i$ is significant.

5. An echo canceller with N sound signal channels each having a loudspeaker and an associated microphone, N being an integer greater than or equal to 1, including:
    means for computing auxiliary signals, comprising:
        means for forming blocks each containing a pre-specified number of samples of the sound signal, two successive blocks mutually overlapping over a pre-specified number of samples;
        means for weighting the samples of each block by an apodisation window, placed at the output of the means for forming blocks;
        means for computing a Fourier transform, placed at the output of the weighting means;
        means for computing the lower and upper frequency values of adjacent critical bands, or a look-up table containing these values;
        means for computing an energy distribution function on the critical bands, the value, in a given critical band, of the energy distribution function being computed by adding the energy of the different spectrum lines belonging to this critical band;
        a second look-up table, containing values representing the basilar spreading functions each associated with a given critical band;
        means for computing a spread spectrum $E_i$, by computing, for a given critical band, the convolution product of the energy distribution function and the spreading function associated with this critical band;

means for computing a correction factor Oi associated with a given critical band;

means for computing a frequency masking threshold Ti associated with a given critical band, from the spread spectrum and from the correction factor Oi associated with this critical band, the frequency masking threshold Ti being defined as follows:

$$10 \log_{10} Ti = 10 \log_{10} Ei - Oi - Ci$$

where Ci is an additional threshold correction parameter;

means for generating synthetic signals having the spectral characteristics of a white noise;

control means, connected to the N sound signal channels, for computing for each critical band said additional threshold correction parameter Ci from several characteristics of the sound signals from the N channels;

means for bringing the level of a synthetic signal to the value of the associated frequency masking threshold, so as to obtain an auxiliary signal;

means for computing an inverse Fourier transform;

memory means for storing the result of the processing of the successive blocks;

means for combining the result of the processing of a block with the result of the processing of the previous block;

sequential reading means connected to said memory means, in order to pass the rate of data from the block rate to the sample rate;

N first adder means respectively placed on the N sound signal channels, for adding on each channel the received sound signal and the associated auxiliary signal;

N×N adaptive filtering means, including N adaptive filtering means associated with each of the N microphone channels, and each having coefficients which form an estimation of the impulse response of the acoustic coupling path between the loudspeaker and the microphone associated with one of the N sound signal channels;

second adder means, connected to the output of the N adaptive filtering means associated with each microphone channel, for adding the output signals of these N adaptive filtering means;

N subtractor means each placed at the output of said second adder means and connected respectively to the microphones of the N sound signal channels, for subtracting on each microphone channel the signal obtained at output from said second adder means from the signal received by the microphone of this channel;

means for computing on each microphone channel an estimation error from the result supplied by the subtractor means connected to the microphone of this channel;

means for correcting in an iterative manner the respective coefficients of the N adaptive filtering means associated with each of the N microphone channels, as a function of the estimation error associated with each microphone channel.

6. A device according to claim 5, wherein the characteristics serving to compute said additional threshold correction parameter Ci include the respective level of the signals of the N channels and a set of values of the inter-correlation function of at least some pairs of these signals, said additional correction parameter Ci being a function increasing with the values of this inter-correlation function.

7. A device according to claim 5, wherein the characteristics serving to compute said additional threshold correction parameter Ci include the sum of the energies contained in the various critical bands of each channel and the ratio of the energies per critical band of at least some pairs of the different channels, wherein the more the sum of the energies contained in the various critical bands is significant and the less the ratio of the energies per critical band of a pair of channels is different between the different critical bands, then the more said additional correction parameter Ci is significant.

8. A device according to claim 5, further comprising means for computing a tonality index αi from the energies of the spectrum lines belonging to the different critical bands, said means for computing the correction factor Oi computing said correction factor Oi from said tonality index αi.

9. A device according to claim 8, wherein said means for computing the correction factor Oi supply a correction factor Oi defined by:

$$Oi = \max(SO, \alpha i \cdot (k1 + Bi) + (1 - \alpha i) \cdot k2)$$

where max(a, b) designates the largest of the values a and b, where SO, k1 and k2 are parameters of pre-specified value in dB, where αi is the tonality index associated with the considered critical band, and where Bi designates the frequency of the critical band in Bark.

10. A device according to claim 9, wherein SO=24.5 dB, k1=14.5 dB and k2=5.5 dB.

11. A device according to claim 8, wherein the means for computing the tonality index supply a constant tonality index, identical for all the critical bands and defined by:

$$\alpha i = \alpha = \min(SFM/SFM \max, 1)$$

where min(a, b) designates the smallest of the values a and b, where SFMmax is a parameter of pre-specified value in dB associated with a pure sinusoidal signal, and where SFM=$10 \log_{10} G/A$ where $\log_{10}$ designate the logarithm to base 10, G designates the geometric mean of the energy over a pre-specified number of points of the Fourier transform and A designates the arithmetic mean of the energy over the same number of points.

12. A device according to claim 11, wherein SFMmax=−60 dB.

* * * * *